United States Patent
Young

[15] 3,699,472
[45] Oct. 17, 1972

[54] ATHERMALLY STABLE LASER DEVICE

[72] Inventor: Charles Gilbert Young, Storrs, Conn.

[73] Assignee: American Optical Corporation, Southbridge, Mass.

[22] Filed: March 10, 1970

[21] Appl. No.: 18,253

[52] U.S. Cl............331/94.5, 330/4.3, 252/301.4 F, 252/301.6 F, 106/52
[51] Int. Cl...............................................H01s 3/16
[58] Field of Search....252/301.4 F, 301.6 F; 106/52; 331/94.5; 330/4.3

[56] References Cited

UNITED STATES PATENTS

| | | | |
|---|---|---|---|
| 3,535,266 | 10/1970 | Lee | 252/301.4 F |
| 3,384,597 | 5/1968 | Paolis et al. | 252/301.6 F |
| 3,422,025 | 1/1969 | Snitzer et al. | 252/301.6 F |
| 3,528,927 | 9/1970 | Graf | 252/301.6 F |

Primary Examiner—James E. Poer
Assistant Examiner—J. Cooper
Attorney—Lane, Aitken, Dunner & Ziems and William C. Nealon

[57] ABSTRACT

Laser light generator containing a glass laser rod with a composition so chosen that the net thermal effects on the index of refraction are negated. The algebraic sum of the effects of the change in index of refraction caused by the temperature coefficient of the index of refraction, the coefficient of linear expansion, Poisson's ratio and the stress-optical effects, for light in one plane of polarization is chosen to be near zero, while remaining small but negative for the other polarization component.

10 Claims, 3 Drawing Figures

3,699,472

INVENTOR
CHARLES GILBERT YOUNG

BY Lane, Aitken, Dunner & Ziems
ATTORNEYS

ATHERMALLY STABLE LASER DEVICE

BACKGROUND OF THE INVENTION

The field of this invention is lasers and more particularly glass laser materials which reduce the effects of thermal gradients within the laser material.

It is known that if the only light allowed to reflect bidirectionally through the cavity of a laser light generator is light emitted in the axial plane wave modes, a high degree of emissive efficiency is achieved. This desired result is accomplished by limiting stimulated emission predominantly to mode-selected plane wave light energy.

The laser output of light in the plane wave front which is the useful portion of the output pulse is significantly greater for laser light resulting essentially from bidirectional reflection of axial light than it is when bidirectional reflection of light in off-axis modes is allowed to develop in the cavity. With predominantly axial light being the only light reflected, the beam spread angle of the output pulse is reduced, and as a result the output intensity, or power per unit solid angle delivered by the laser at any given distance (an inverse function of the beam spread angle), is advantageously increased. These same mode-selective considerations are useful with all laser generators, that is, amplifiers as well as oscillators.

In laser applications it is desirable to maintain the beam spread angle at a low value. As is pointed out above, this can be accomplished by mode selection which limits the modes propagating and reflecting within the laser cavity to axial modes. This type of mode selection has been accomplished through mechanical means. Laser devices including such mechanical mode selection means are suitable to produce a laser output with a small beam spread angle provided the laser is not operated at repetition rates sufficiently high so that succeeding shots occur before complete cooling results from prior shots. With high repetition rates of, for example, about one pulse per minute (ppm) for a 4 cm-diameter rod or about one pulse per second (pps) for a 6 millimeter-diameter rod, it is necessary to consider the thermal effects created by pumping the laser rod if the beam spread angle is to be maintained at a minimum.

Pumping is accomplished by a flash tube, as it is called, which provides the initial energy inversion. The flash tube may be in the form of a helix concentrically surrounding and in spatial relationship to the laser rod, with coils that are equally spaced along the length of the laser rod to distribute its heat emission evenly along the length of the rod. However, the radial heat distribution is quite uneven with the flash tube causing different temperatures at the axis of the rod than at the periphery. The thermal stress distribution in the rod is, therefore, similarly uneven, causing an index of refraction gradient from the center to the edge of the rod during "pumping" by the flash tube and a resulting reduction in beam definition which is intimately related to a desired laser output. During operation of laser devices cooling-gradient induced index changes also occur which cause similar if not more serious problems than pumping-gradient induced index changes. Also, the same type of temperature variations are produced with other flash tubes such as those in cylindrical form with the cylinder axis parallel and spatially related to the laser rod.

Furthermore, stress birefringence is caused throughout the laser rod by uneven temperature, so that light polarized tangentially encounters a different index of refraction than light polarized radially at all points not on the axis. The total result of the varying indices of refraction is a difference in path length with both distance from the axis and with polarization and a consequent reduction beam definition.

In short, pump-induced and cooling-induced index-of-refraction gradients across the diameter of a laser rod are very undesirable. These gradients arise largely because of induced temperature gradients. However, for single-shot operation the temperature gradient during the pulse can be made negligible by mode selecting as described above or by proper choice of doping level and pumping geometry. For high-repetition-rate operation, however, there is necessarily a radial temperature gradient since heat is being introduced uniformly per unit volume but is only extracted through the outer surface. The magnitude of the thermal gradient depends on the thermal conductivity of the laser glass, the magnitude being high for glasses with low thermal conductivity.

In general, a radial thermal gradient will produce a radial gradient in the index of refraction. In the case of laser glass, this index gradient is such that the index of refraction is higher in the center of the rod than at its surface, resulting in a positive lens effect induced in the rod. This occurs for rods having a length to diameter ratio ($L/D$) of about 1 or greater. For a $L/D$ of about 1 or less, the thermal gradient is predominantly axial. However, the most efficient glass laser operation occurs with a $L/D$ of about 40:1, so the thermal gradient associated with most lasers is predominantly radial. Also, in most lasers the ends of the rods are often masked from the pumping light, so that any possible axial gradient is further reduced. For a $L/D = 40:1$ laser rod, a lens power of +8 diopter ($D$) has been measured in an 18 inch pumped length of a laser rod at an otherwise desirable operating point. In such a case, the incident parallel laser light is focused to a point within the laser rod. The undesirability of such focusing is immediately apparent when it is considered that one of the advantages of light generated by a laser is that such light should be collimated.

In connection with a solution to this problem it is known that the thermal conductivity of glass cannot be changed significantly. It is also known that the index gradient resulting from a given temperature gradient is a complicated function of the expansion coefficient, the index of refraction, Poisson's ratio, Young's modulus and the stress-optic coefficients.

The presence of induced positive lens power in a laser rod has the following undesirable consequences:

1. The active laser volume is reduced, reducing the laser efficiency and increasing the tendency toward damage,
2. The beam spread of the laser increases, which is undesirable because the maximum laser energy deliverable at a target is obtained with the minimum beam spread,
3. Self-focusing, normally seen in many materials under the influence of a high-power laser beam, occurs at a much lower threshold when even a small amount of positive lens power is initially present in the material. Self-focusing occurs because the index of refraction, $n$, is expressible as $n = n_o + n(E^2)$, where $n_o$ is the usual index of refraction and $n(E^2)$ is a small change in $n$ caused by the presence of the high intensity laser electric Field E. Since $n(E^2) > 0$, and laser beams in general are Gaussian-like in shape, i.e., with a higher intensity at beam center than at beam edge, the index of refraction will, in general, be higher at the center of the medium than at the edge. If $n(E^2)$ is high enough, the beam collapses due to this dynamic positive lensing into a diffraction-limited filament. At this point the power density exceeds the damage threshold of the material and a fine fossil record is left of the laser beam passage, and 4. Optical elements in the laser cavity can be damaged because of the reduced beam diameter caused by thermal lensing.

For the most part, the laser art is proceeding without compensation for these problems although a number of approaches have been employed in an attempt to circumvent the thermal lensing problem.

One approach is to use rods of small cross-section as the laserable material. The disadvantages of this approach are that the obtainable output energy is too low and the beam spread is too high due to diffraction from the necessarily small aperture.

Another approach is to place a negative lens in the laser cavity. In general, however, lens compensation is impractical, especially for the stress birefringence, since a fixed lens becomes useless in the face of a constantly changing variation in the indices of refraction; and, obviously, a series of insertable lenses are also unsatisfactory.

Another approach is to use curved end mirrors to offset the thermally-induced positive lens power of the reduced beam diameter caused by the thermal lensing.

Another technique is the placement of an afocal telescope inside the laser cavity to reduce the effects of the thermally-induced lens power on the damage threshold of the cavity elements.

In general, the disadvantages of using extra elements in the cavity are that such elements can work for only one set of operating conditions, and that with long rods, a focus can occur within the rod, which cannot be corrected with extra elements. Also the efficiency of the laser is, in general, reduced by these elements. Another disadvantage is that the laser cavity cannot be aligned statically, i.e., the thermally-induced positive lens power must be present to balance the negative correction in order to pass a collimated beam through the laser for alignment purposes. Of course, with extra elements in the cavity complexity, cost, alignment difficulties and damage probabilities all increase.

The foregoing approaches utilize various physical means to nullify or eliminate thermal gradients. The present invention utilizes a laser glass of special composition which nullifies the effect of thermal gradients. The use of compositions to nullify the effect of thermal gradients is not in and of itself novel. However, in all of the know prior art laser devices which include a glass composition so selected to nullify the effect of thermal gradients various physical components were required along with the glass composition. For example, athermally stable compositions have been suggested for either radially polarized light or tangentially polarized light. For such compositions, physical means for mode selecting to either radially polarized or tangentially polarized modes are required. Compositions have also been suggested for a laser which propogates both radially and tangentially polarized light but in this case a Faraday rotator is required in the cavity in order to average the radial and tangential distortions associated with the glass. It has been considered desirable to nullify the effects of thermal gradients solely with an appropriate composition of the laserable material without the necessity of rotators or mode selecting means. This is especially desirable in Q-switched systems utilizing a long rod and low output reflectors since in such a system most of the energy build-up occurs in the last pass through the rod, so that any form of discrete-element, intracavity correction scheme is not capable of correcting for the thermally-induced lens power in the rod.

This situation is especially acute with devices that average the radial and tangential distortions by alternating between these distortions through the use of a ⅛-wave Faraday rotator within the cavity. Such a scheme is effective under long-pulse operation. However, the averaging effect is not as successful in a high-performance Q-switched laser, where the change in pulse energy is very large for each pass through the rod.

In fact with Q-switched operations, an averaging scheme using a ⅛-wave Faraday rotator is not totally effective in preventing self-focusing in the rod because of the small residual thermally-induced positive lens power in the rod for one polarization.[1] When laser intensity (1. As is explained below, except for Pockel's glass which is a poor laser glass, it is not possible to correct for both polar components of polarization simultaneously. builds up in a few round-trip passes in the laser cavity and with the greatest accretion of energy occurring on the last pass through the rod the residual positive lens characteristic which cannot be prevented promotes self-focusing.

SUMMARY OF THE INVENTION

In accordance with the present invention, a glass composition is utilized which enables discrimination between the radial and tangential polarization light vectors by athermalizing for only one of these vectors while over-athermalizing for the other vector. When the glass is athermalized for radially polarized light the tangentially polarized light vectors are over-athermalized and are propogated within the laser glass as if the laser glass were a negative lens. Thus, the selected polarization component which propogates within the negative lens has a tendency to miss the end reflectors in the laser cavity and pass outside the laser configuration The glass may also be athermalized for tangentially polarized light and over-athermalized for radially polarized light.

It is accordingly an object of the present invention to provide a means for compensating for the effects of thermal gradients and stress birefringence produced in a laser rod by the heat from the flash tube.

It is an additional object of the present invention to compensate for the effects of thermal gradients without the utilization of polarization rotators or mode selecting means.

It is a further object of the invention to provide a laser device which is athermally stable for all modes propogating within the laser cavity.

DESCRIPTION OF THE PREFERRED EMBODIMENTS

Figure 1:
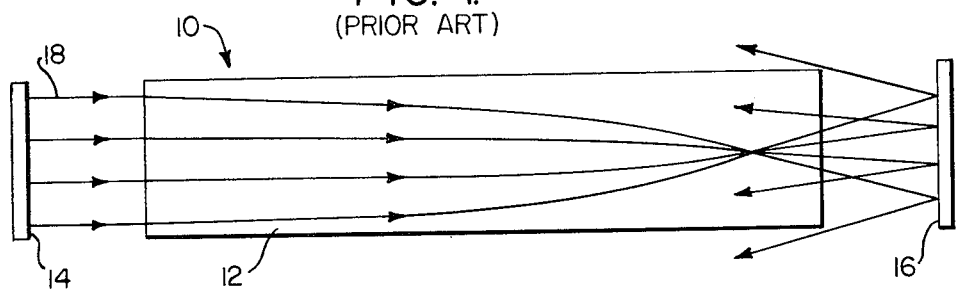
FIG. 1 is a diagrammatic illustration of a prior art laser device showing focusing of the laser output when a thermal gradient is present.

The present invention is a laser device which is athermally stable even when operated at high repetition rates. In general, laser devices are thermally unstable due to gradients induced across the rod. These gradients arise largely because of induced temperature gradients but are also the result of various other factors. For example, a non-uniform inversion will produce a non-uniform index of refraction. This factor, however, is easily eliminated by arranging the pump light uniformly along the laser material so that there is equal inversion along any radius. Temperature gradients can arise from non-uniform azimuthal heating, but by placing flashtubes symmetrically about the rod this non-uniform azimuthal heating can be avoided. However, radial gradients in the rod are inevitable if reasonable pulse repetition rates and cooling of the rod occur. Thus, even with the elimination of azimuthal gradients, distortion of the cavity nevertheless arises. Such distortions are due to three factors. The change in temperature ($\Delta T$) from center to edge of the rod leads to an expansion gradient in the rod due to the coefficient of expansion of the glass, causing the index of refraction to decrease with increasing temperature. With a difference in temperature from center to edge of the rod the index of refraction also differs from center to edge because the change of index with temperature at constant density is positive for common laser glasses. Finally, thermal gradients ($\Delta T$) within the glass produce stresses which result in both a change in index of refraction and birefringence. For glasses, the change in index of refraction with temperature increase, $\alpha_n$, can be positive or negative. Because of this fact the effects producing the index change can be made to cancel each other by an appropriate glass composition with the correct negative value of $\alpha_n$ which algebraically cancels the other positive factors.

Presently only one particular glass is known with such a negative $\alpha_n$ which is athermally stable for both radial and tangential components of polarization. This glass is a glass developed by Pockels.[1] ([1]F. Pockels, Ann Physik, Vol. 9, p. 220 (1902); Vol. 11, p. 650 (1903) Unfortunately, the Pockels glass has been found to be a poor laser glass. Also, in order to achieve the balance with both components of polarization at $1.06\mu$ (the neodymium wavelength) the temperature must be lowered to approximately dry ice temperature.

In accordance with the present invention, the laser glass is so selected that it is athermally stable for either radially polarized light or tangentially polarized light, but not both. The composition is also over-athermalized for the particular vector for which the glass is not thermally stable. Thus, a composition which is athermally stable for radially polarized light is over-athermalized for tangentially polarized light and vice versa.

The following discussion, which appears in the article "Glass Lasers" by E. Snitzer in Applied Optics, Vol. 5, Number 10, October 1966, the teachings of which are incorporated herein by reference, demonstrates that it is theoretically possible to athermalize a glass for either radially or tangentially polarized light.

For a solid rod of length $L$, the total optical path length $P_r(r)$ for a typical ray parallel to the axis and displaced a distance $r$ from the center and with its plane of polarization in the radial direction is given by $$P_r(r) = nL\{1 + [\alpha_n T - p/v\,(\epsilon_z + \epsilon_\theta) - q/v\,\epsilon_r]\}, \quad 2.$$

where $n$ is the index of refraction of the glass with no temperature gradient and no strain and $T$ is the difference in temperature between he center and points at a distance $r$ from the center. The $\epsilon$'s are the strains in a cylindrical coordinate system. The quantities $q/v$ and $p/v$ are the strain-optic coefficients which relate the change in index of refraction to the strains in the directions parallel and perpendicular, respectively, to the plane of polarization of the light. The corresponding expression for tangential polarization is $$P_\theta(r) = nL\{1 + [\alpha_n T - p/v\,(\epsilon_z + \epsilon_r) - q/v\,\epsilon_\theta]\}. \quad 3.$$

For an isotropic medium, the principle strains are related to the stresses $\sigma$ by $$\epsilon_r = E^{-1}[\sigma_r + s(\sigma_\theta + \sigma_z)]$$
$$\epsilon_\theta = E^{-1}[\sigma_\theta - s(\sigma_r + \sigma_z)] \quad 4.$$
$$\epsilon_z = E^{-1}[\sigma_z - s(\sigma_r + \sigma_\theta)]$$

where E is Young's modulus and s Poisson's ratio.

For a long rod with the end effects neglected, the problem is one of plane strain. If the ends are free of traction so that they can move in response to the heating, the stresses are related to the thermal distribution by $$\sigma_r = \frac{\alpha E}{1-s}(F-R)$$
$$\sigma_\theta = \frac{\alpha E}{1-s}(F+R-T)$$
$$\sigma_z = \frac{\alpha E}{1-s}(2F-T) \quad (5)$$

where $\alpha$ is the linear expansion coefficient and where $F$ and $R$ are defined by $$F = a^{-2}\int_0^a Tr\,dr$$
$$R = r^{-2}\int_0^a Tr\,dr \quad (6)$$

a being the radius of the rod. The dependence of the optical path length on the temperature can be obtained by substituting from (5) into (4) and in turn into (2) and (3). The quantities desired are the differences in optical path lengths $\Delta P_A(r)$ and $\Delta P_\theta(r)$ between rays through the center and through points at $r$. The results are $$\Delta P_r(r) = nLT\left\{\alpha_n - \frac{\alpha}{1-s}\left[\frac{R}{T}(1+s)\left(\frac{p}{v}-\frac{q}{v}\right)\right.\right.$$
$$\left.\left.-2(1-s)\frac{p}{v}+2s\frac{q}{v}\right]\right\} \quad (7)$$

$$\Delta P_\theta(r) = nLT\left\{\alpha_n - \frac{\alpha}{1-s}\left[-\frac{R}{T}(1+s)\left(\frac{p}{v}-\frac{q}{v}\right)\right.\right.$$
$$\left.\left.-(1-3s)\frac{p}{v}-(1-s)\frac{q}{v}\right]\right\} \quad (8)$$

The difference between $\Delta P_r$ and $\Delta P_\theta$ gives the birefringence. If $p/v$ and $q/v$ are equal, as they are for a Pockels glass, there is no birefringence. Furthermore, the only quantity which depends on the details of the temperature is $R$ and it has a coefficient which goes to zero for a Pockels glass. It is interesting to note that the average of the radial and tangential components of $\Delta P$ is also independent of $R$.

The conditions for the quantities in the braces in (7) and (8) to be equal to zero can be regarded as a requirement on the $\alpha_n/\alpha$. This is because $s$, $p/v$ and $q/v$ do not depend strongly on the glass composition. Several glasses have been measured, including lead silicates, borosilicates, and alkaline earth silicates and it has been found that Poisson's ratio varies from 0.19 to 0.26. Furthermore, the quantities in braces in (7) and (8) are not sensitively dependent on s. Pockels measurements indicate $p/v = q/v = 0.42$ for a silicate glass containing approximately 75 percent by weight of PbO. For the more common glasses the strain-optic coefficients are smaller; $q/v$ decreases more rapidly than $p/v$. A light flint silicate (54.3 wt. percent $SiO_2$, 33 PbO, 1.5 $B_2O_3$ $3Na_2O$, 8 $K_2O$) has the values $p/v = 0.306$ and $q/v = 0.213$, and for a borosilicate crown (68.2 wt. percent $SiO_2$, 10 $B_2O_3$, 10 $Na_2O$, 9.5 $K_2O$, 2 $Al_2O_3$) $p/v = 0.269$ and $q/v = 0.147$.

To obtain an estimate of the required $\alpha_n$ to reduce the various $\Delta P$'s to zero, typical values for the parameters are assigned. The strain-optic parameters are taken as $p/v = 0.3$ and $q/v = 0.21$ and Poisson's ratio as $s = 0.25$. A linear expansion coefficient of $\alpha = 10^{-5/\circ}$ C is assumed. If the temperature $T$ varies as $r^p$, then $R/T = 1/(p+2)$; for a quadratic dependence of $T$ on the radius, $p = 2$ and $R/T = \frac{1}{4}$. With these values for the parameters the braces in (7), (8) are equal to zero for $\alpha_n = 42 \times 10^{-7/\circ}$ C, $-34 \times 10^{-7/\circ}$ C, $38 \times 10^{-7/\circ}$ C, respectively. Note that the required values of $\alpha_n$ are all negative.

From the foregoing it is clear that for a parabolic radial temperature distribution, the changes in pathlength can be written as:

$$\Delta P_r(r) = nLT\left\{\alpha_n - \frac{\alpha}{1-s}\left[\frac{(1+s)}{4}\left(\frac{p}{v}-\frac{q}{v}\right)\right.\right.$$
$$\left.\left.-2(1-s)\frac{p}{v}+2s\frac{p}{v}\right]\right\} (15)$$

$$\Delta P_\theta(r) = nLT\left\{\alpha_n - \frac{\alpha}{1-s}\left[-\frac{(1+s)}{4}\left(\frac{p}{v}-\frac{q}{v}\right)\right.\right.$$
$$\left.\left.-(1-3s)\frac{p}{v}-(1-s)\frac{q}{v}\right]\right\} (16)$$

Equations 15 and 16 show that it is theoretically possible to reduce the effects of thermal gradients by utilizing a glass composition with a proper $\alpha_n$ which causes the glass to exhibit no appreciable change in optical pathlength from center to edge of the rod for one polarization when the temperature gradient is present while causing the difference in optical pathlength from center to edge for the other polarization to increase.

In addition to the foregoing theoretical proof, actual tests have indicated that for a number of glasses, it is possible to athermalize for light which is either radially or tangentially polarized, i.e., $\Delta P_r(r) = 0$ or $\Delta P_\theta(r) = 0$, and that under these conditions light in the other plane of polarization can have $\Delta P(r) > 0$. Thus, either one of a radially or tangentially polarized component of a beam can pass through a rod containing a radial temperature gradient and see no lens power while the remaining polarization can see a negative lens power. Accordingly, only either radially or tangentially polarized beams, but not both, build up cavity oscillations. The non-oscillating tangentially or radially polarized component is refracted out of the cavity.

In order to illustrate the laser device of the present invention, a typical prior art laser device 10 is shown in FIG. 1 for comparison and comprises a glass laser rod 12 optically aligned between reflectors 14 and 16. Lightwaves making a single complete pass through laser rod 12 are shown by arrows 18. Lightwaves 18 are parallel rays as they enter laser rod 12 but when a temperature gradient is present within rod 12 as the light travels within the rod, the rays converge and focus, causing a loss of collimation.

Figure 2:
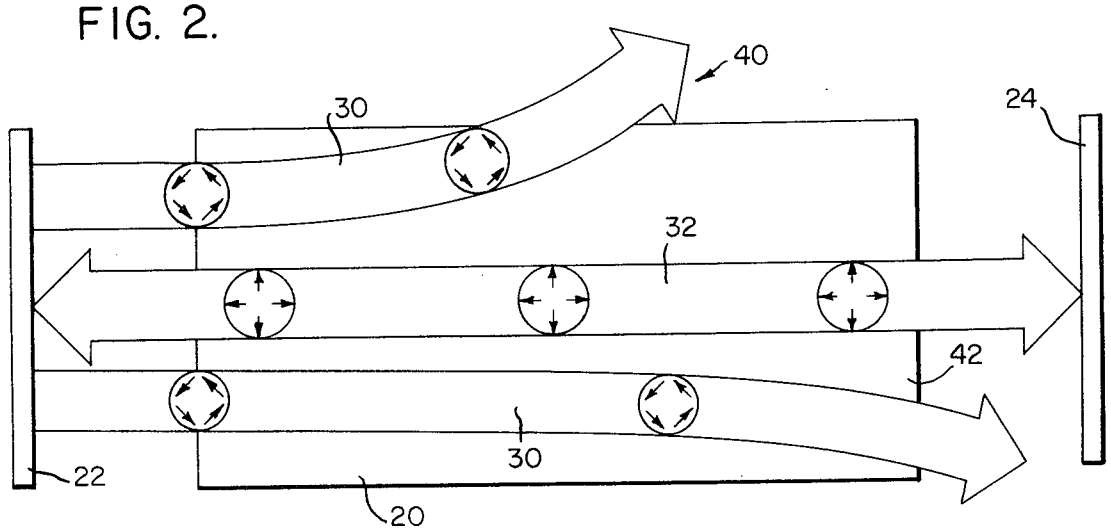
FIG. 2 is a diagrammatic illustration of a laser device in accordance with the present invention utilizing a laser rod that is stable for the radial component of polariaztion and over-athermalized for the tangential component when a temperature gradient is present.
Figure 3:
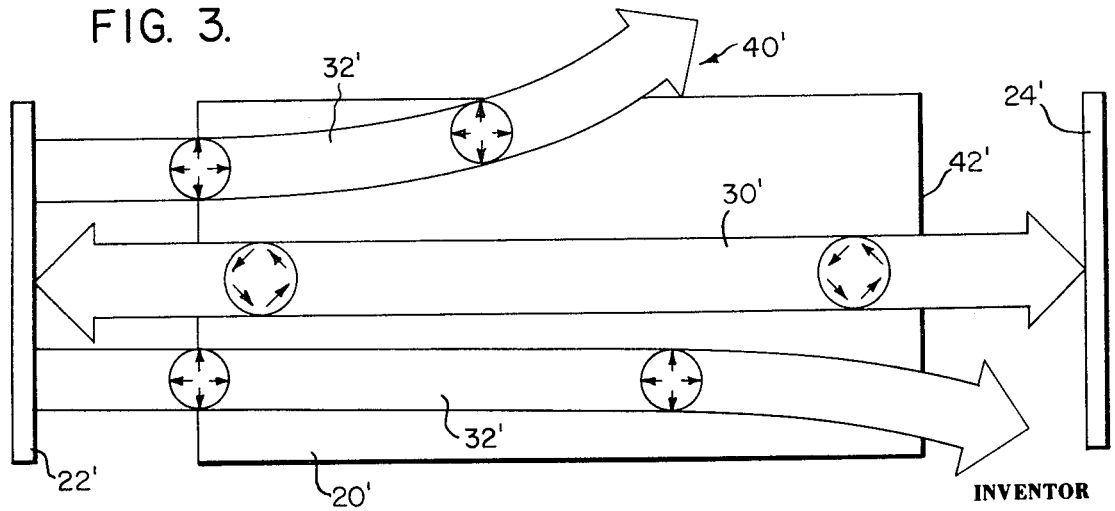
FIG. 3 is a view similar to FIG. 2 illustrating an embodiment of the invention which is thermally stable for the tangential component.

The laser device of the present invention is shown in FIGS. 2 and 3 and comprise a rod 20, 20' optically aligned in a resonant cavity formed by reflectors 22, 22' and 24, 24'. In connection with the laser cavity, it is to be understood that the invention is not intended to be limited to laser oscillators. The laser rod of the present invention can be utilized in amplifying devices which do not include end reflectors forming a cavity and in fact such amplifiers are athermally stable when rods in accordance with this invention are utilized. With oscillators once pumped by a suitable pump source (not shown) to an excited state, laser oscillations occur between reflectors 22, 22' and 24, 24'. The laser light which results from laser rod 20 has two components of polarization, a tangential component and a radial component. In FIG. 2, the tangential component is represented by arrow 30 and the radial component is represented by arrow 32. In FIG. 3, the tangential component is represented by arrow 30' and the radial component is represented by arrow 32'.

The device shown in FIG. 2 is athermalized for radially polarized light and over-athermalized for tangentially polarized light. As a result, radially polarized light 32 oscillates and propogates within laser rod 20 without appreciable bending, thereby providing a collimated output of this component of polarization. The composition is over-athermalized for the tangential component of polarization so that the tangential component of polarization 30 which also propogates within laser rod 20 is bent by the laser rod. Such bending causes this component of polarization to pass outside the laser cavity by being refracted through the edge of the glass as shown at 40 or by passing through the end of the rod as shown at 42 at such an angle that this component misses the end reflector 24. Such bending eliminates the non-collimated light rays. The device shown in FIG. 3 is identical in operation to the device shown in FIG. 2 except that the composition is chosen to be athermally stable for tangentially polarized light and oversathermalized for radially polarized light.

In connection with the foregoing illustrations of the invention, it is to be understood that rectangular or slab laser rods as well as circular cylindrical laser rods can be athermalized in accordance with the invention.

As was explained above, various glasses were tested. The composition in percent by weight of representative examples of such glasses is given in Table I below:

TABLE I

| Component | 1 | 2 | 3 | 4 | 5 | 6 | 7 | 8 |
|---|---|---|---|---|---|---|---|---|
| $SiO_2$ | 59.33 | 41.56 | 46.37 | 41.95 | 40.93 | 67.10 | 42.01 | 39.13 |
| $Li_2O$ | | | | | 1.00 | | | |
| $Na_2O$ | | 14.42 | | 15.84 | | | 7.20 | |
| $K_2O$ | 27.23 | | 25.39 | | 22.41 | 10.90 | 23.10 | |
| $Rb_2O$ | | | | | | | | 37.83 |
| CaO | 8.11 | | 7.64 | | 18.51 | 4.80 | 18.81 | 12.41 |
| BaO | | 26.74 | | 23.50 | | | | |
| ZnO | | | 4.42 | 4.12 | 3.90 | 1.50 | 3.99 | 3.30 |
| $Al_2O_3$ | | 2.75 | 3.91 | 2.43 | 1.50 | 2.50 | 2.06 | |
| $Sb_2O_3$ | 1.05 | 0.85 | 1.11 | 0.37 | 0.98 | 1.00 | 2.68 | 1.18 |
| $TiO_2$ | | | 6.62 | 5.11 | 5.84 | | 5.88 | |
| $Nd_2O_3$ | 2.43 | 0.98 | 5.67 | 5.16 | 5.00 | 5.00 | 1.03 | 4.09 |
| SnO | 1.95 | | | | | | | |
| $Nb_2O_3$ | | 15.45 | | | | | | |
| Inert impurities | | | | .03 | .04 | | | |

The various glasses shown in Table I were formed into rods suitable for laser applications and the rods were tested to determine the change in optical pathlength from center to edge of the rod for both the radial and tangential components of polarization. The rods were measured for such a change in pathlength by passing a 1.06 micron gas laser beam through the rod and measuring the optical power. The change in pathlength from center to edge $\Delta P$ was determined from the measurement of optical power in accordance with the following relationship: $P = (2 \Delta P/R^2)$, where $P$ is the optical power and $R$ is the radius of the rod.

The results of the foregoing measurements are shown in Table II below:

TABLE II

| Example | Radial Measurement $\Delta P/\Delta Tl$ | Tangential Measurement $\Delta P/\Delta Tl$ | $\alpha_n$ Per Degree Centigrade × $10^{-7}$ |
|---|---|---|---|
| 1 | $.727 \times 10^{-6}$ | $-.351 \times 10^{-6}$ | $-32.$ |
| 2 | $.642 \times 10^{-6}$ | $-.532 \times 10^{-6}$ | $-28.$ |
| 3 | $-.130 \times 10^{-6}$ | $-.144 \times 10^{-5}$ | $-40.6$ |
| 4 | $.815 \times 10^{-6}$ | $-.598 \times 10^{-6}$ | $-33.5$ |
| 5 | $-.129 \times 10^{-6}$ | $-.119 \times 10^{-5}$ | $-32.5$ |
| 6 | $.269 \times 10^{-5}$ | $.144 \times 10^{-5}$ | $-21.8$ |
| 7 | $-.461 \times 10^{-7}$ | $-.125 \times 10^{-5}$ | $-41.$ |
| 8 | $-.845 \times 10^{-6}$ | $-.188 \times 10^{-5}$ | $-49.5$ |

The change in pathlength for both the radial and tangential components of polarization are expressed in units which represent the change in pathlength from center to edge of the rod per unit temperature per unit of length. In connection with these units it is to be understood that the measurements are not absolute but represent a relative measurement which is useful in accordance with the present invention.

In connection with Table II, Example 6 is a laser glass which is representative of a common prior art glass previously used in devices for applications where thermal gradients are expected. Comparison of the measurements for Example 6 with the measurements for the other examples shown in Table II reveals that Examples 7 and 8 exhibit improved thermal stability in accordance with the teachings of the invention when incorporated in a laser device. As is shown in these Examples, the optical pathlength difference from center to edge for radially polarized light is very small when a temperature gradient is present and in fact approaches zero, thereby stabilizing this component of polarization. On the other hand, the optical pathlength difference for the tangential component is large in comparison with the radial component and is negative, indicating that the light diverges and thus passes from the laser cavity in accordance with the theory of the invention. The remaining Examples 1 – 5 also show excellent properties in accordance with the invention in that the optical pathlength difference for one component approaches zero while rays of the other component diverge as propogated.

All of the glasses shown in Table II are laser glasses, that is, they contain active ions which exhibit stimulated emission when excited by a pump light source. When such glasses are formed into laser rods and the rods are positioned along an optical axis within an optically regenerative cavity, light amplification of the stimulated emission occurs. With laser glass having properties approaching those disclosed in this specification, the output of laser light from the optically regenerative cavity will have less of a beam spread than previously known laser devices.

The preparation of the glass of Example 7 is given below. The following total amounts of batch constituents are added to a ceramic crucible which is preheated to a temperature of 2700° F:

| Constituent | Weight in Grams |
|---|---|
| $SiO_2$ | 3360.80 |
| $K_2CO_3$ | 2481.60 |
| $KNO_3$ | 344.00 |
| $Ba(NO_3)$ | 2558.40 |
| $TiO_2$ | 470.40 |
| ZnO | 319.20 |
| $Al(OH)_3$ | 305.60 |
| $Sb_2O_3$ | 214.40 |
| $Nd_2O_3$ | 82.40 |

The constituents are melted under a nitrogen atmosphere and are loaded in portions sufficient to allow for the expansion of gases. Crucible filling is accomplished in approximately 5 hours. After filling, the crucible is maintained at a temperature of 2700° F for about hour and then lowered to a temperature of 2400° F and maintained at that temperature for about 2 hours. The temperature of the crucible is thereafter brought to 2300° F and maintained at that temperature for about 15 hours. The temperature is decreased to 2200° F and maintained at that temperature for about 1 hour and then increased to 2400° F and stirred for about 8 hours. Thereafter the temperature is lowered 50° F and stirred for about 16 hours at 2350° F. The stirrer is removed and the glass allowed to cool to 2200° F, whereupon the glass is poured into a graphite mold which is preheated to 800° F. The cast glass is then annealed for about 36 hours starting at 1030° F and is stopped at a temperature of about 300° F. The initial temperature drop during the annealing cycle is about 30° F per hour for the first few hours.

The other glasses shown in Table I can be prepared by a similar procedure when an adjustment for the constituents is made so as to correspond to the composition of the final product.

Accordingly, by using glasses having the physical properties described above it is possible to utilize oscillators and amplifiers with large laser glass components at high repetition rates without the problems associated with thermal gradients.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combined to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity.

2. The apparatus as set forth in claim 1 wherein the first polarization component is radially polarized light.

3. The apparatus according to claim 1 wherein the second polarization component is tangentially polarized light.

4. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| $SiO_2$ | 59.33 |
| $K_2O$ | 27.23 |
| $CaO$ | 8.11 |
| $Sb_2O_3$ | 1.05 |
| $Nd_2O_3$ | 2.43 |
| $SnO$ | 1.95 |

5. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| SiO$_2$ | 41.56 |
| Na$_2$O | 14.42 |
| BaO | 26.74 |
| Sb$_2$O$_3$ | 0.85 |
| Nd$_2$O$_3$ | 0.98 |
| Nb$_2$O$_3$ | 15.45 |

6. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combined to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| SiO$_2$ | 46.37 |
| K$_2$O | 25.39 |
| CaO | 7.64 |
| ZnO | 4.42 |
| Al$_2$O$_3$ | 2.75 |
| Sb$_2$O$_3$ | 1.11 |
| TiO$_2$ | 6.62 |
| Nd$_2$O$_3$ | 5.67 |
| Inert impurities | .03 |

7. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| SiO$_2$ | 41.95 |
| Na$_2$O | 15.84 |
| BaO | 23.50 |
| ZnO | 4.12 |
| Al$_2$O$_3$ | 3.91 |
| Sb$_2$O$_3$ | 0.37 |
| TiO$_2$ | 5.11 |
| Nd$_2$O$_3$ | 5.16 |
| Inert impurities | .04 |

8. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| SiO$_2$ | 40.93 |
| K$_2$O | 22.41 |
| CaO | 18.51 |
| ZnO | 3.90 |
| Al$_2$O$_3$ | 2.43 |
| Sb$_2$O$_3$ | 0.98 |
| TiO$_2$ | 5.84 |
| Nd$_2$O$_3$ | 5.00 |

9. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| $SiO_2$ | 42.01 |
| $K_2O$ | 23.10 |
| $CaO$ | 18.81 |
| $ZnO$ | 3.99 |
| $Al_2O_3$ | 2.50 |
| $Sb_2O_3$ | 2.68 |
| $TiO_2$ | 5.88 |
| $Nd_2O_3$ | 1.03 |

10. A laser apparatus for generating laser light in two polarization components, a first polarization component and a second polarization component, the laser apparatus comprising pumping means, a glass laser rod and an optically regenerative laser cavity defined by a pair of reflectors, said glass laser rod being positioned between said pair of reflectors in optical contact with said pumping means, said glass laser rod having a negative index of refraction for a temperature increase so that thermal gradient factors including the coefficient of linear expansion, the temperature coefficient of the index of refraction, Poisson's ratio, and the stress-optical effects, algebraically tend to cancel each other out for light in the first polarization component so as to reduce the difference between the optical path length of the first polarization component in a ray through the center of said rod with the optical path length for the first polarization component in a ray passing along said rod near the periphery thereof when a temperature gradient caused by pumping said rod by said pumping means is present within said rod from its center to its periphery, said negative index of refraction of said glass laser rod also being of a value so that thermal gradient factors algebraically combine to render the optical path length greater at the periphery of said rod than at the center of said rod for light generated in the second polarization component, the laser rod being positioned within said laser cavity in relationship to said reflectors so that light in the first polarization component strikes the reflectors while light in the second polarization component misses said reflectors and passes from said laser cavity and wherein said glass rod is of approximately the following weight percent of constituents:

| | |
|---|---|
| $SiO_2$ | 39.13 |
| $Rb_2O$ | 37.83 |
| $CaO$ | 12.41 |
| $ZnO$ | 3.30 |
| $Al_2O_3$ | 2.06 |
| $Sb_2O_3$ | 1.18 |
| $Nd_2O_3$ | 4.09 |

* * * * *